3,466,242
METHOD FOR FRACTURING OIL WELLS WITH LOW FLUID LOSS FRACTURING FLUIDS
Gifford G. McClaflin and Claud L. Jacocks, Ponca City, Okla., assignors to Nalco Chemical Company, Chicago, Ill., a corporation of Delaware
No Drawing. Continuation-in-part of application Ser. No. 384,778, July 23, 1964. This application May 27, 1968, Ser. No. 732,082
Int. Cl. E21b 43/25; C09k 3/00
U.S. Cl. 252—8.55    16 Claims

ABSTRACT OF THE DISCLOSURE

Composition and method for controlling the fluid loss of oil-base fluids used in hydraulically fracturing subterranean formations. The fluid loss additive which is added to the oil-base fluid comprises from 80 to 98 percent of an oil-insoluble solid particulate material encapsulated with from 20 to 2 percent of an in situ-formed polymer derived from a 1-olefin.

Cross references to related applications

The present application is a continuation-in-part of copending patent application, Ser. No. 384,778, filed July 23, 1964, now abandoned entitled "Method for Fracturing Oil Wells With Low Fluid Loss Fracturing Fluids."

This invention relates to an oil well fracturing method having low fluid loss, and to a fracturing fluid.

In the art of fracturing oil and gas wells, a special fluid composition (usually called fracturing fluid) is pumped down the well into contact with the formation to be fractured, and the pressure of the fluid composition is increased until the formation is fractured by hydraulic pressure. It is then usually desirable to incorporate a propping material, such as sand, in the fracturing fluid whereby the propping material is carried into the fracture with the fracturing fluid. After the fracture has been extended to the extent desired, the pressure in the well bore is decreased and the fracturing fluid flows back into the well bore. At least a portion of the propping material is deposited in the fracture for maintaining the fracture open and enhancing the flow of formation fluids through the fracture into the well bore.

The extent of the fracture obtained is dependent primarily upon the penetrating characteristics of the fracturing fluid. Therefore, a primary concern in the art has been to reduce the penetrating characteristics (usually called the fluid loss) of the fracturing fluids. Another consideration in the manufacture of fracturing fluids is viscosity. Some operators desire a high viscosity fracturing fluid, and others desire a low viscosity fracturing fluid. Therefore, it is highly desirable from an economical point of view that the same basic fracturing fluid can be readily adapted to either a high or low viscosity fluid.

Many attempts have been made to solve these problems of the art, and particularly the reduction of the fluid loss of fracturing fluids.

An object of the invention is an additive for decreasing fluid loss during oil or gas well fracturing.

Another object is a fracturing fluid for use in oil or gas wells which fluid has low fluid loss.

Still another object is a method for fracturing oil or gas wells wherein there is no appreciable loss of fluid to the formation during the fracturing operation.

Other objects of the invention will become apparent during the detailed description thereof.

Brief summary of the invention

Briefly, the fracturing fluid of the invention comprises a hydrocarbon oil base fluid and dispersed therein about 0.02–0.10 lb. per U.S. gallon of oil of loss additive which consists essentially of free-flowing coated particles; said coated particles consisting of oil-insoluble solid particles encapsulated with thermoplastic polymeric material; said polymeric material having been derived from 1-olefin monomer; and said coated particles having been prepared by polymerizing said monomer in the presence of said solid particles thereby encapsulating said solid particles with said polymeric material.

The fracturing method of the invention consists essentially of using the aforesaid fracturing fluid in any of the fracturing methods known to this art.

Detailed description

The hydrocarbon oil base fluid which may be used as the carrier or vehicle in the fracturing fluid may be substantially any hydrocarbon liquid. For example, crude oil which is normally available in the vicinity of the well-working operation may be used. Such crude oils range in viscosity from 5 to 100 centipoises, but usually between 15 to 25 centipoises taken at a temperature of 70° F. In addition, petroleum products may be used, such as kerosene, pale oil, diesel fuel, fuel oil, gas oil, and the like.

The fluid loss additive of the invention consists essentially of free-flowing, finely divided coated particles. The coated particles include a solid which is of low solubility in the hydrocarbon oil base fluid. Desirably, the solid does not dissolve to any significant extent during the period after the fluid has been prepared at the well head to the completion of the fracturing operation; therefore, the solid may be considered as oil-insoluble. It is to be understood that the solid must not deactivate the polymerization catalyst system. A wide variety of insoluble solids are now used in oil well and gas well drilling; any of these may be used herein. Illustrative of suitable solids are silica flour, oyster shell flour, crushed limestone, barium sulfate, calcium chloride, sodium chloride, carbon black, fuller's earth, magnesium sulfate, mica, coal dust, walnut shells and sand. The particle size range of these insoluble solids varies from about 50 microns down to about 0.005 micron. It is preferred that a substantial number of the particles be within the range of 5 to 0.005 micron.

The solid particles are coated (encapsulated) by thermoplastic polymeric material derived from 1-olefin monomer. The coating increases the particle size of the oil-insoluble solid only slightly.

The coated particles generally consist of about 80–98 percent of the defined solid particle and the remainder, i.e., 20–2 percent, of the thermoplastic polymeric encapsulating material. More usually, the coated particles consist of 90–95 percent of the defined solid and 10–5 percent of the thermoplastic polymeric encapsulating material. (All percentages herein are weight percent.)

The polymeric encapsulating material of the invention is derived from 1-olefin monomer or monomers having from 2 to about 18 carbon atoms. Preferably, the polymeric material contains a substantial amount of amorphous constituent. It may be essentially entirely amorphous in nature. An especially suitable source of higher 1-olefins is the growth product of triethyl aluminum and ethylene; particularly 1-olefin monomers having about 6 to 18 carbon atoms. A polymeric material may be made from a process mixture of monomers having 6 through 18 carbon atoms. Or, a narrower range of mixed olefins may be used, e.g., a mixture of 6, 8, and 10 carbon atoms; a mixture of 12 and 14 carbon atoms. It is to be understood these "narrow" mixtures when obtained by distillation of a broad range mixture will contain some amount of lower and higher boiling range monomers.

The polymeric material includes not only homopolymers and copolymers of 1-olefins, it also includes copolymers of 1-olefin and ethylene wherein the 1-olefin is present in a major proportion. An especially suitable copolymer is derived from a mixture of propylene and ethylene.

The polymeric material may include, if desired, oxidation inhibitors and other stabilizers.

The coated (encapsulated) particles may be made by polymerizing the defined monomer, in the presence of the solid particles, using any of the known processes for making solid polyethylene, solid polypropylene and copolymers thereof. Especially useful are those polymers made with a Ziegler-type catalyst system, e.g., a mixture of an alkyl aluminum compound and a compound of a heavier metal of Group IV–B, V–B, or VI–B of the Mendeleev periodic system of the elements.

The polymer is laid down, as it forms, on the surface of the solid particles thereby encapsulating the particles. As the polymerization zone is intimately mixed, each particle is encapsulated in its own polymer coating.

Some agglomeration may occur. The term "free-flowing" is intended to mean a mixture having flow properties somewhat like those of the oil-insoluble solid particles charged to the polymerization operation.

The coated particles are readily dispersible in hydrocarbon oil by ordinary mixing means or line mixers.

The amount of the defined additive present in the fracturing fluid will vary with the requirements of the particular formation and also with the composition of the particular additive. In general, about 0.02–0.10 pound of additive is present per U.S. gallon of oil. More commonly, and especially when using the preferred 1-olefin polymers, the usage of additive is about 0.025–0.050 pound per U.S. gallon of oil.

It is to be understood that the fracturing fluid may include, in addition to the defined additive and defined oil, one or more components such as are commonly used in fracturing fluid, e.g., gelling agents and propping agents.

ILLUSTRATION I

One embodiment of the fluid loss additive of the instant invention was prepared as follows: A 500-milliliter resin flask equipped with a "Teflon" stirring blade of such dimensions that, when rotated, it scraped the sides and bottom of the lower one-fourth of the resin flask, and inlets for nitrogen, ethylene and propylene. The flask was placed in a dry box and charged with:

185 g. silica flour, less than 325 mesh commercial grade, dried in electric furnace at 1200° F. for 16 hours; 2 ml. (0.014 m.) of $Al(C_2H_5)_3$; and
1.55 ml. (0.014 m.) of $TiCl_4$.

The flask was sealed, removed from the dry box and weighed. The system was assembled and flushed with nitrogen for fifteen minutes while the mixture was vigorously stirred. Ethylene was introduced at the rate of 15 liters per hour. Propylene was simultaneously introduced at the rate of 120 liters per hour. Polymerization was continued for one and one-half hours at which time a weight increase of 12 grams was recorded. Ethylene polymerizes approximately 16 times faster than propylene. At these addition rates it is believed there was produced a copolymer containing 66.6 percent ethylene and 33.3 percent propylene.

A fracturing fluid was prepared by blending the above prepared free-flowing coated particles into an Oklahoma crude oil from Willie Cry field—0.05 pound of additive per U.S. gallon of crude. The fluid was tested for its stability to decrease fluid loss by modified API RP39 Method at 125° F. and 1000 p.s.i. pressure. This procedure was modified in that only 50 milliliters test fluid was placed in the fluid loss apparatus and the time for this 50 milliliters to flow through the filter was measured. The test quantity of 50 ml. of fluid needed 6.0 minutes to flow through the filter. A blend of silica flour alone in this crude oil—0.05 lb./gal.—was tested; 50 ml. of fluid passed in less than 1 minute.

ILLUSTRATION II

For comparative purposes a second fluid loss additive was prepared using the same materials and procedures as described in Illustration I, except that the silica flour ingredient was omitted, i.e., only an ethylene-propylene copolymer in particulate form was formed. The fluid loss control of this copolymer was tested in the same manner as described in Illustration I. The test quantity of 50 milliliters of fluid flowed through the filter in less than ½ minute. Thus, the fluid loss control of the composition of this invention as described in Illustration I was far superior to that afforded by the composition of illustration II, i.e., copolymer without silica flour.

ILLUSTRATION III

For further comparison, a third fluid loss additive was prepared by mixing together in a flask equal weights of the ethylene-propylene copolymer of Illustration II and silica flour to form an intimate dispersion. The fluid loss control of this blend was tested in the same manner as described in Illustrations I and II at a concentration of 0.05 pound of additive per U.S. gallon of crude oil (0.025 lb./gal. ethylene-propylene copolymer plus 0.025 lb./gal. silica flour). Using this blend, 50 milliliters of fluid flowed through the filter in less than 1 minute. Thus, the fluid loss control of the composition of this invention (ethylene-propylene copolymer encapsulated silica flour) as described in Illustration I was far superior to that afforded by a mere mixture of ethylene-propylene copolymer particles and silica flour particles.

Thus having described the invention, what is claimed is:

1. In the method of fracturing a subterranean formation traversed by a well bore wherein hydrocarbon oil is forced into the well bore under pressure the method of sealing subterranean formations traversed by the well bore against loss of appreciable amounts of said oil to the formation, which comprises incorporating in said oil an additive consisting of:
   free-flowing coated particles, having a particle size of less than about 50 microns in an amount of about 0.02–0.10 pound per U.S. gallon of oil;
   said coated particles consisting of about 80–98 percent of oil insoluble solid particles encapsulated with about 20–2 percent of solid thermoplastic polymeric material;
   said polymeric material having been derived from 1-olefin monomer having from 2 to 18 carbon atoms; and
   said coated particles having been prepared by polymerizing said monomer in the presence of said solid particles thereby encapsulating said solid particles with said polymeric material.

2. A method in accordance with claim 1 wherein said oil-insoluble solid is silica flour.

3. A method in accordance with claim 1 wherein said oil-insoluble solid is limestone.

4. A method in accordance with claim 1 wherein said polymeric material is derived from propylene and ethylene.

5. A method in accordance with claim 1 wherein said coated particles are present in an amount of about 0.025–0.050 pound per U.S. gallon of oil.

6. A process in accordance with claim 1 wherein said coated particles consist of said solids 90–95 percent and said polymeric material, 10–5 percent.

7. In the method of fracturing a subterranean formation traversed by a well bore wherein hydrocarbon oil is forced into the well bore under pressure the method of sealing subterranean formations traversed by the well bore against loss of appreciable amounts of said oil to the formation, which comprises incorporating in said oil an additive consisting of:
   free-flowing coated particles, having a particle size over the range of about 0.005–50 microns; in an amount of about 0.02–0.10 pound per U.S. gallon of oil;

said coated particles consisting of about 90–95 percent of an oil-insoluble solid particle encapsulated with about 10–5 percent of solid thermoplastic polymeric material;

said polymeric material having been derived from propylene and ethylene;

said coated particles having been prepared by polymerizing said propylene and ethylene in the presence of said solid particles thereby encapsulating said solid particles with said polymeric material.

8. A method in accordance with claim 7 wherein said oil-insoluble solid is silica flour.

9. A hydrocarbon oil base oil well fracturing fluid comprising:

a hydrocarbon oil; and dispersed therein about 0.02–0.10 pound per U.S. gallon of oil of a fluid loss additive; wherein said additive consists essentially of free-flowing coated particles having a size of not more than about 50 microns;

said particles consisting of oil-insoluble solid particles encapsulated with solid thermoplastic polymeric material;

said polymeric material having been derived from 1-olefin monomer having from 2 to 18 carbon atoms; and said coated particles having been prepared by polymerizing said monomer in the presence of said solid particles thereby encapsulating said solid particles with said polymeric material.

10. A fluid in accordance with claim 9 wherein said oil-insoluble solid is silica flour.

11. A fluid in accordance with claim 9 wherein said oil-insoluble solid is limestone.

12. A fluid in accordance with claim 9 wherein said polymeric material is derived from propylene and ethylene.

13. A fluid in accordance with claim 9 wherein said coated particles are present in an amount of about 0.025–0.050 pound per U.S. gallon of oil.

14. A fluid in accordance with claim 9 wherein said coated particles consist of said solids 90–95 percent, and said polymeric material, 10–5 percent.

15. A hydrocarbon oil base oil well fracturing fluid comprising:

a hydrocarbon oil; and dispersed therein about 0.025–0.050 pound per U.S. gallon of oil of a fluid loss additive; wherein said additive consists essentially of free-flowing coated particles having a particle size over the range of 0.005 and 50 microns;

said coated particles consisting of about 90–95 percent of oil-insoluble solid particles encapsulated with about 10–5 percent of solid thermoplastic polymeric material;

said polymeric material having been derived from propylene and ethylene; and said coated particles having been prepared by polymerizing said propylene and ethylene in the presence of said solid particles thereby encapsulating said solid particles with said polymeric material.

16. A fluid in accordance with claim 15 wherein said oil-insoluble solid is silica flour.

References Cited
UNITED STATES PATENTS

| | | | |
|---|---|---|---|
| 2,596,843 | 5/1952 | Farris | 252—8.55 |
| 2,779,735 | 1/1957 | Brown et al. | 252—8.55 |
| 2,969,321 | 7/1962 | Carpenter | 252—8.5 |
| 3,046,222 | 7/1962 | Phansalkar et al. | 252—8.55 |
| 3,149,673 | 9/1964 | Pennington | 252—8.55 |
| 3,251,769 | 5/1966 | Brewster et al. | 252—8.55 |

HERBERT B. GUYNN, Primary Examiner